(12) United States Patent
Wang et al.

(10) Patent No.: US 10,104,118 B2
(45) Date of Patent: *Oct. 16, 2018

(54) DEVICES, SYSTEMS, AND METHODS FOR DETECTING PROXIMITY-BASED MOBILE MALWARE PROPAGATION

(71) Applicant: AT&T Intellectual Property I, L.P., Atlanta, GA (US)

(72) Inventors: Wei Wang, Weehawken, NJ (US); Gang Xu, Piscataway, NJ (US); Gustavo de los Reyes, Fair Haven, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/412,275

(22) Filed: Jan. 23, 2017

(65) Prior Publication Data

US 2017/0134398 A1    May 11, 2017

Related U.S. Application Data

(63) Continuation of application No. 14/886,421, filed on Oct. 19, 2015, now Pat. No. 9,553,890, which is a
(Continued)

(51) Int. Cl.
*H04L 29/06* (2006.01)
*G06F 21/00* (2013.01)
*G06F 21/56* (2013.01)

(52) U.S. Cl.
CPC .......... *H04L 63/145* (2013.01); *G06F 21/564* (2013.01); *H04L 63/1416* (2013.01); *G06F 2221/2111* (2013.01)

(58) Field of Classification Search
CPC . H04L 63/145; H04L 63/1416; G06F 21/564; G06F 2221/2111
See application file for complete search history.

(56) References Cited

U.S. PATENT DOCUMENTS

| 7,096,368 B2 | 8/2006 | Kouznetsov |
| 7,096,501 B2 | 8/2006 | Kouznetsov |

(Continued)

OTHER PUBLICATIONS

Jerry Cheng, Starsky H.Y. Wong, Hao Yang and Songwu Lu., et al., "SmartSiren: Virus Detection and Alert for Smartphones," in: Proceedings of the 5th International Conference on Mobile Systems, Applications and Services, pp. 1-14, 2007.*
(Continued)

*Primary Examiner* — Mohammad A Siddiqi
(74) *Attorney, Agent, or Firm* — Hartman & Citrin LLC (57) ABSTRACT

Devices, systems, and methods are disclosed. An agent resides in a mobile communication device. The agent detects Proximity-based Mobile Malware Propagation. The agent injects one or more trigger network connections in the candidate connection list. These connections appear as legitimate networks and devices, but instead trigger connection to an agent server on a service provider's network. By attempting to connect through the trigger network connection, the malware reveals itself. The system helps collect the malware signature within a short period of time after the malware outbreak in local areas, though such attacks typically bypass network based security inspection in the network.

20 Claims, 7 Drawing Sheets

Related U.S. Application Data continuation of application No. 14/311,433, filed on Jun. 23, 2014, now Pat. No. 9,167,003, which is a continuation of application No. 12/963,617, filed on Dec. 8, 2010, now Pat. No. 8,763,126.

(56) References Cited

U.S. PATENT DOCUMENTS

| | | | |
|---|---|---|---|
| 7,171,690 | B2 | 1/2007 | Kouznetsov |
| 7,266,845 | B2 | 9/2007 | Hypponen |
| 7,401,359 | B2 | 7/2008 | Gartside et al. |
| 7,634,262 | B1 | 12/2009 | Li |
| 7,827,611 | B2 | 11/2010 | Kouznetsov |
| 8,065,731 | B1 | 11/2011 | Nucci et al. |
| 8,087,085 | B2 | 12/2011 | Hu et al. |
| 8,312,545 | B2 | 11/2012 | Tuvell et al. |
| 8,407,793 | B2 | 3/2013 | Demblewski |
| 8,719,941 | B2 | 5/2014 | Demblewski |
| 8,763,126 | B2* | 6/2014 | Wang ............... G06F 21/00 713/1 |
| 9,167,003 | B2* | 10/2015 | Wang ............... G06F 21/00 |
| 9,553,890 | B2* | 1/2017 | Wang ............... G06F 21/00 |
| 2003/0233566 | A1 | 12/2003 | Kouznetsov |
| 2007/0162975 | A1* | 7/2007 | Overton ............ G06F 21/561 726/24 |
| 2007/0289018 | A1* | 12/2007 | Steeves ............ G06F 21/56 726/24 |
| 2008/0003997 | A1 | 1/2008 | Parkkinen |
| 2009/0144823 | A1 | 6/2009 | Lamastra et al. |
| 2009/0209196 | A1 | 8/2009 | Haverty |
| 2010/0011029 | A1 | 1/2010 | Niemela |
| 2010/0064341 | A1 | 3/2010 | Aldera |
| 2010/0100963 | A1 | 4/2010 | Mahaffey |
| 2010/0154060 | A1 | 6/2010 | Demblewski |
| 2010/0328064 | A1 | 12/2010 | Rogel |

OTHER PUBLICATIONS

Cheng, J., et al., "SmartSiren: Virus Detection and Alert for Smartphones," in: Proceedings of the 5th International Conference on Mobile Systems, Applications and Services, pp. 1-14, 2007.

Fleizach, C., et al., "Can You Infect Me Now? Malware Propagation in Mobile I Phone Networks," in: Proceedings of the 2007 ACM Workshop on Recurring Malcode, p. 8.

Fleizach, Christopher Brian, "Can You Infect Me Now? A Treatise on the Propagation of Malware in a Cellular Phone Network," 112 pages, 2007.

U.S. Office Action dated Dec. 5, 2012 in U.S. Appl. No. 12/963,617.

U.S. Office Action dated Jun. 20, 2013 in U.S. Appl. No. 12/963,617.

U.S. Advisory Action dated Oct. 1, 2013 in U.S. Appl. No. 12/963,617.

U.S. Notice of Allowance dated Jan. 31, 2014 in U.S. Appl. No. 12/963,617.

Fovino et al., "An experimental investigation of malware attacks on SCADA systems," International Journal of Critical Infrastructure Protection 2, 2009, pp. 139-145, Elsevier B.V.

Xie et al., "pBMDS: A Behavior-based Malware Detection System for Cellphone Devices," WiSec '10, Mar. 22-24, 2010, ACM.

Leszczyna et al., "MAISim—Mobile Agent Malware Simulator," Proceedings of the First International Conference on Simulation Tools and Techniques for Communications, Networks and Systems, Oct. 30, 2007, ICST.

U.S. Office Action dated Feb. 13, 2015 in U.S. Appl. No. 14/311,433.

U.S. Notice of Allowance dated Jun. 4, 2015 in U.S. Appl. No. 14/311,433.

U.S. Office Action dated Jun. 3, 2016 in U.S. Appl. No. 14/886,421.

U.S. Notice of Allowance dated Sep. 12, 2016 in U.S. Appl. No. 14/886,421.

\* cited by examiner

DEVICES, SYSTEMS, AND METHODS FOR DETECTING PROXIMITY-BASED MOBILE MALWARE PROPAGATION

CROSS-REFERENCE TO RELATED APPLICATIONS

This application claims priority to and is a continuation of U.S. patent application Ser. No. 14/886,421 entitled "Devices, Systems, and Methods for Detecting Proximity-Based Mobile Malware Propagation," filed Oct. 19, 2015, now U.S. Pat. No. 9,553,890, which is incorporated herein by reference in its entirety; and which is a continuation of and claims priority to U.S. patent application Ser. No. 14/311,433, entitled "Devices, Systems, and Methods for Detecting Proximity-Based Mobile Malware Propagation," filed Jun. 23, 2014, now U.S. Pat. No. 9,167,003, which is incorporated herein by reference in its entirety; and which is a continuation of and claims priority to U.S. patent application Ser. No. 12/963,617, entitled "Devices, Systems, and Methods for Detecting Proximity-Based Mobile Malware Propagation," filed Dec. 8, 2010, now U.S. Pat. No. 8,763,126, which is incorporated herein by reference in its entirety.

BACKGROUND

1. Field of the Subject Disclosure

The present subject disclosure relates to mobile malware. More specifically, the present subject disclosure relates to detecting proximity-based mobile malware propagation.

2. Background of the Subject Disclosure

Mobile communication devices, such as cellular telephones, have become a common tool of everyday life. Cellular telephones are no longer used simply to place telephone calls. With the number of available features rapidly increasing, cellular telephones are now used for storing addresses, keeping a calendar, reading e-mails, drafting documents, etc. These devices are small enough that they can be carried in a pocket or purse all day, allowing a user to stay in contact almost anywhere. Recent devices have become highly functional, providing applications useful to business professionals as well as the casual user.

Proximity-based Mobile Malware Propagation (PMMP) is a category of malware that propagates through proximal connectivity such as WiFi, Bluetooth, and infrared. The target victims are any communication device that has a WiFi, Bluetooth, IR, or any other module for proximal communication. These modules are now included in default configurations from many manufacturers. More risk exists for devices that are in a "discoverable" mode, in which the devices broadcast connection availability to all nearby devices. Also at risk are devices with either no password or PIN protection, or weak password or PIN protection. Although slower than propagation schemes such as network-based instant messages and emails, proximity-based malware is compelling in its unique advantage that it is unobservable by the service provider network. Thus, it is substantially more challenging to detect proximity-based malware propagation than network-based malware propagation.

Proximity-based malware propagation, by establishing short range wireless connection with victims, is a preferred method for mobile malware. Detection for proximity-based malware is still an open issue due to the fact that such malware has two main advantages compared to malware that uses network-based propagation. First, proximity-based propagation malware is difficult to detect because the communication between the attacker and the victims bypasses network-based security inspection. The provider network cannot observe any traffic or signals in proximity-based malware propagation because these attacks launch locally. Second, proximity-based propagation is more likely to succeed due to the weak security in local connectivity technologies. Consequently, there is an increasing amount of mobile malware that propagates through proximity-based WiFi and Bluetooth connections. Well-known mobile malware that utilizes such vulnerabilities includes Lasco, Locknut, Cabir, ComWar, PBStealer, and Skuller. Given sufficient time, a Bluetooth malware can infect all susceptible devices in the network. Therefore, it is important to detect such activities locally and quickly.

Malware that uses PMMP can execute in three different ways. One way is through an established connection. If the victim device has already established connections with other devices, the attacker can utilize these established connections to infect other victim devices. Another way is to scan-connect. The attacker can actively scan and search for all the devices within the proximity. Then the malware will attempt to connect to these newly discovered devices and request establishment of new connections. If these devices have no (or weak) passwords and PIN numbers, or if users acknowledge these connection requests, then these devices will be infected. One other way is to re-connect. If the victim device caches previously established connection settings, including security cookies such as password/PIN, then the attacker can avoid security challenges to establish connections and execute the propagation.

The victim device is a device that has been infected and controlled by the attacker to propagate the malware to other benign devices in proximity. Malware propagation through an established connection is difficult to detect. The impact of malware propagation through an established connection, however, is restricted in small local areas due to two aspects. First, assume that the mobile devices move frequently and that the average duration of an established connection is short. The probability that the victim device has a live connection when it is infected is very low. Second, the number of devices being infected through the established connection is also small, usually one device at a time. Thus, such propagation most likely will die out and impact only a few devices.

What is needed is a method of tracking PMMP in cases where the mobile device is infected without an active connection.

SUMMARY

The present subject disclosure solves the above problems with novel devices, systems, and methods that leverage an agent that resides in a mobile communication device to detect PMMP. The agent injects one or several trigger network connections in the candidate connection list. These connections appear as legitimate networks and devices. However, the triggers connect to an agent server on a service provider's network. Essentially, the method is based on the assumption that malware lacks the intelligence to differentiate the trigger network connection from a normal network connection. Therefore, by attempting to connect through the trigger network connection, the malware reveals itself.

Unlike other detection methods, which need malware signatures or traces, the proposed system, devices, and methods do not rely upon collecting such statistics and patterns. For this purpose, the light-weight technology can be massively deployed on mobile communication devices easily. The system collects local malware information that is unreachable by the ISP core networks. Whenever a trigger connection is attempted, the agent collects new malware signatures. The proposed proximity-based propagation detection exposes mobile malware quickly as these agents are deployed on mobile communication devices at different geographic locations. The proximity-based propagation detection is a passive detection system, which does not use any of the radio resources when the network is attack free. By tracing back the telephone numbers, the infected mobile communication devices are identified, which assists deploying mitigation plans, such as disinfection patches for customers, etc. This trigger system can be extended in many areas, by inserting trigger resources such as links, directories, devices, etc., in "sensitive" places, where risks reside.

In one exemplary embodiment, the present subject disclosure is directed to a mobile communication device. The mobile communication device includes a processor, a memory in communication with the processor, a transceiver in communication with the processor, a malware on the memory, and an agent logic on the memory for discovering a plurality of devices in a proximity, compiling a list of discovered devices in the proximity, inserting a trigger into the list of discovered devices, receiving a request to connect to the trigger from the malware, and reporting a malware activity to an agent server on a network. The trigger appears to the malware to be a discovered device.

In another exemplary embodiment, the present subject disclosure is directed to a system for tracking proximity-based mobile malware propagation. The system includes a network, a mobile communication device in communication with the network, an agent server in communication with the network, a malware on the mobile communication device, and an agent logic on the mobile communication device for discovering a plurality of devices in a proximity, compiling a list of discovered devices in the proximity, inserting a trigger into the list of discovered devices, receiving a request to connect to the trigger, and reporting a malware activity to the agent server. The trigger appears to the malware to be a discovered device.

In yet another exemplary embodiment, the present subject disclosure is directed to a method for tracking proximity-based mobile malware propagation. The method includes discovering a plurality of devices in a proximity, compiling a list of discovered devices in the proximity, inserting a trigger into the list of discovered devices, receiving a request to connect to the trigger, and reporting a malware activity to an agent server on a network. The trigger appears to a malware to be a discovered device.

DETAILED DESCRIPTION

The present subject disclosure solves the above problems with novel devices, systems, and methods that leverage an agent that resides in a mobile communication device to detect PMMP. The agent injects one or several trigger network connections in the candidate connection list. These connections appear as legitimate networks and devices. The triggers, however, connect to an agent server on a service provider's network. The devices, systems, and methods can operate based on the assumption that malware lacks the intelligence to differentiate the trigger network connection from a normal network connection. Therefore, by attempting to connect through the trigger network connection, the malware reveals itself.

The total number of deployed malware detection agents depends on the usage of such a system. If the system is used for the purpose of collecting new PMMP based malware signatures, then a number of selected mobile devices in the network are recruited as agents at different locations. If the purpose is to identify all devices that have been infected by the malware, then malware detection agents should be deployed on each device.

In principal, the proposed idea is extended to detect any attacks that rely on the discover-infect propagation model. In other words, if the malware searches for system resources or devices in its discovery phase, a trigger device is created for the malware to find. For example, a malware attempts to attack flash memory of mobile phones (such as the Cardblock attack in 2005) by copying the malware to the victim phone, then a bogus flash drive is deployed, which can be utilized as a trigger system for alarms.

"Mobile communication device," as used herein and throughout this disclosure, refers to any electronic device capable of wirelessly sending and receiving data. A mobile communication device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMs (read-only memories), EPROMs (erasable programmable read-only memories), and EEPROMs (electrically erasable programmable read-only memories).

"Logic," as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a telecommunication network, logic may be programmed on a server, or a complex of servers. A particular logic unit is not limited to a single logical location on the telecommunication network.

Mobile communication devices communicate with each other and with other elements via a network, for instance, a wireless network, or a wireline network. A "network" can include broadband wide-area networks such as cellular networks, local-area networks (LAN), and personal area networks, such as near-field communication (NFC) networks and/or networks using BLUETOOTH technologies. Communication across a network is preferably packet-based; however, radio and frequency/amplitude modulations networks can enable communication between mobile communication devices using appropriate analog-digital-analog converters and other elements. Communication is enabled by hardware elements called "transceivers." Mobile communication devices may have more than one transceiver, capable of communicating over different networks. For example, a cellular telephone can include a cellular transceiver for communicating with a cellular base station, a Wi-Fi transceiver for communicating with a Wi-Fi network, and a BLUETOOTH transceiver for communicating with a BLUETOOTH device. A network typically includes a plurality of elements that host logic for performing tasks on the network.

For the following description, it can be assumed that most correspondingly labeled structures across the figures (e.g., 115 and 215, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

Figure 1:
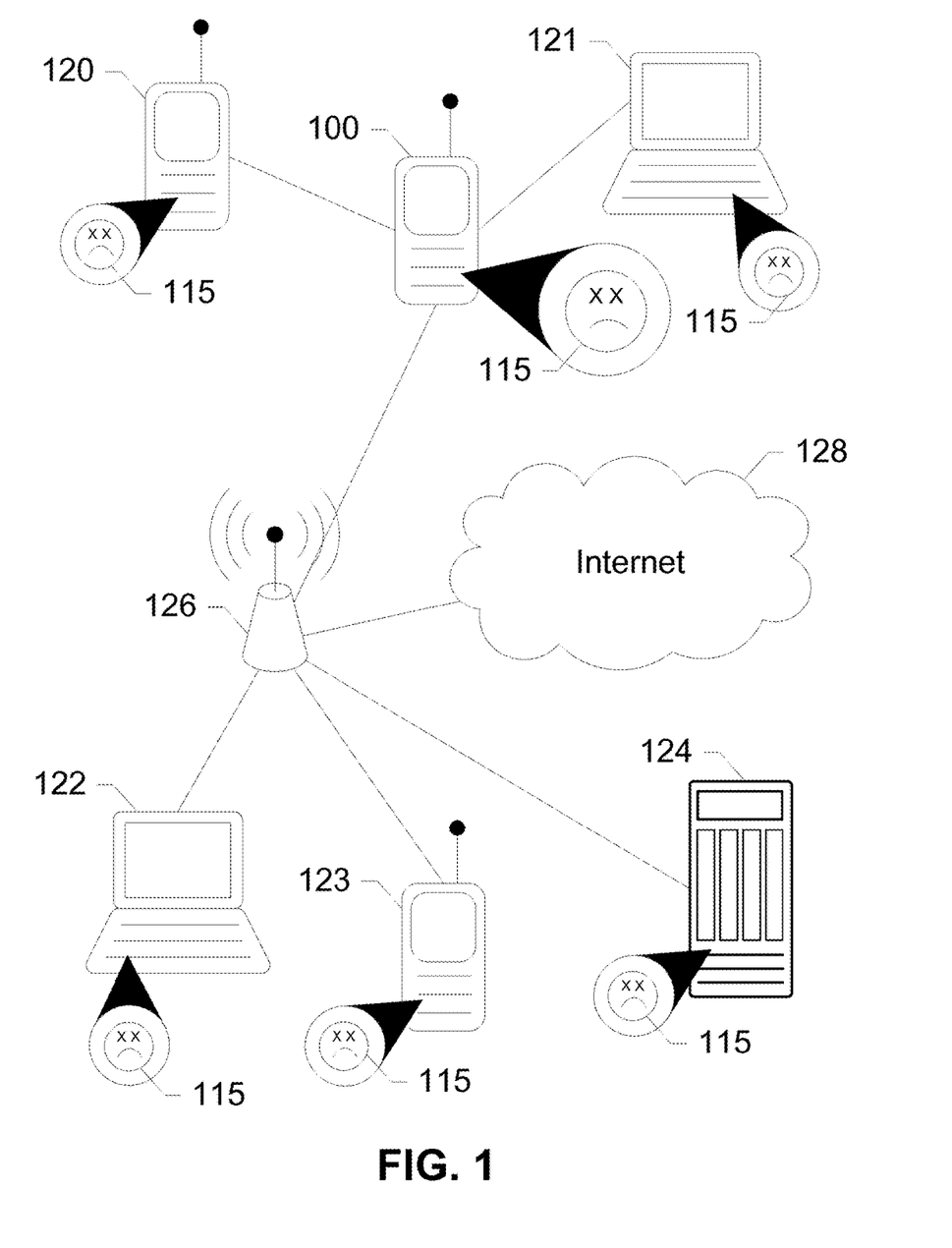
FIG. 1 shows a proximity-based mobile malware propagation model, according to an exemplary embodiment of the present subject disclosure.

FIG. 1 shows a proximity-based mobile malware propagation model, according to an exemplary embodiment of the present subject disclosure. The model includes a source mobile communication device 100 including a malware 115, a plurality of victim mobile communication devices 120-124, each including a malware 115, a wireless access point 126, and an internet 128. In this model, a source mobile communication device 100 communicates with victim mobile communication devices 120 and 121 through a wireless peer-to-peer (P2P) communication protocol in order to spread a malware 115. Before communicating with the victim mobile communication devices 120 and 121, the malware 115 must use the source mobile communication device 100 to discover the victim mobile communication devices 120, 121. Upon command from the malware 115, the source mobile communication device 100 broadcasts a discover signal. The victim mobile communication devices 120, 121 respond to the discover signal from the source mobile communication device 100. Then, the source mobile communication device 100 sends each of the victim mobile communication devices 120, 121 the malware 115. The source mobile communication device 100 is also in communication with the wireless access point 126. The victim mobile communication devices 122, 123, and 124 are connected to the wireless access point 126 in order to communicate with the Internet 128. The source mobile communication device 100 sends the malware 115 to each of the victim mobile communication devices 122-124 through the wireless access point 126. The malware 115 is capable of repeating these same actions on the victim mobile communication devices 120-124 to send the malware 115 to more mobile communication devices through P2P communication or through other wireless access points.

This model shows the potential problem in the current local network. Local malware propagation via wireless access points and P2P communication is stealthy due to a lack of security deployment on wireless access points and mobile communication devices. The P2P communication used by these mobile communication devices can be any of a BLUETOOTH communication, a Near Field Communication (NFC) communication, etc. Wireless access points use any WiFi standard including 802.11a, b, g, i, n, etc.

Figures 2A, 2B:
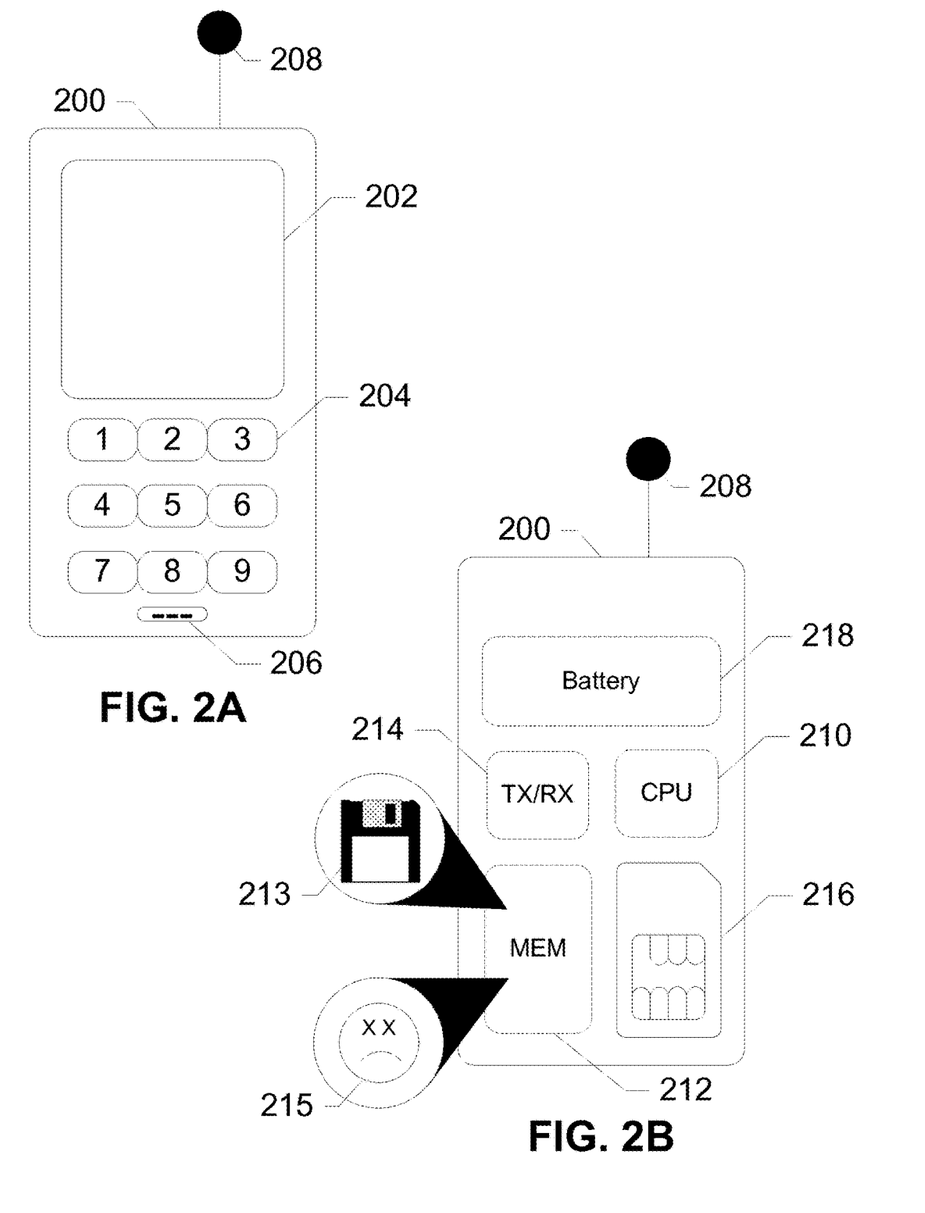
FIG. 2A shows a mobile communication device, according to an exemplary embodiment of the present subject disclosure.
FIG. 2B shows the inner components of a mobile communication device, according to an exemplary embodiment of the present subject disclosure.

FIG. 2A shows a mobile communication device 200, according to an exemplary embodiment of the present subject disclosure. The mobile communication device 200 includes a display 202, a keypad 204, a microphone 206, and an antenna 208. The display 202 is a liquid crystal display (LCD) that serves as a visual output for the user. The keypad 204 is an input for entering information and commands to mobile communication device 200. The microphone 206 accepts aural input and allows the mobile communication device 200 to deliver audio communication to the network and other mobile communication devices. The antenna 208 sends and receives wireless radiofrequency (RF) signals to and from wireless networks and other wireless devices.

FIG. 2B shows the inner components of the mobile communication device 200, according to an exemplary embodiment of the present subject disclosure. The inner components of the mobile communication device 200 include a processor 210, a memory 212 including an agent logic 213 and a malware 215, a transceiver 214, a removable memory card 216, and a battery 218. The processor 210 receives input and issues commands to deliver output through the other components. The memory 212 holds information for enabling processor 210 to operate the other components of mobile communication device 200 and contains the agent logic 213 and the malware 215. The agent logic 213 intercepts discovery requests, such as from the malware 215, and inserts triggers into discovered device lists. Triggers appear to a user of the mobile communication device 200 to be unknown and/or unattractive options for communication. The triggers appear to the malware 215, however, to be substantially similar to every other option for communication. When a trigger is selected for communication, such as by the malware 215, the agent logic 213 is used to report malware activity to an agent server on a network. The transceiver 214 converts wireless signals received by the antenna 208 to information capable of processing by the processor 210, and vice-versa. The transceiver 214 can use one or more wireless protocols, including cellular RF, WiFi, BLUETOOTH, etc., to communicate with the network and other mobile communication devices. The battery 218 powers the mobile communication device 200.

There are many embodiments of a mobile communication device that are capable of being equipped with embodiments of the present subject disclosure. For instance, many legacy model cellular telephones are capable of executing the agent logic described above. In other embodiments of the mobile communication device, other displays are used, such as an LED display, an OLED display, etc. In some embodiments, the display is used as a touch-sensitive input device, i.e., a touch screen. A touch screen allows the user to view output on the display as well as use the display to provide input. In some touch screen embodiments, the mobile communication device may not have a physical keypad for input. Instead, a virtual keypad is displayed on the touch screen and the user provides input by touching the virtual keys. Other forms of input such as full keyboards, accelerometers, motion sensors, etc., can be utilized in the mobile communication device. The memory can be a non-removable internal memory, or a removable memory such as in a subscriber identity module (SIM) card or a memory card inserted into a memory card reader. Many mobile communication devices have more than one transceiver or a transceiver that supports more than one protocol. For instance, it is not uncommon for a mobile communication device to support cellular radio frequency (RF), WiFi, and BLUETOOTH protocols.

Figure 3:
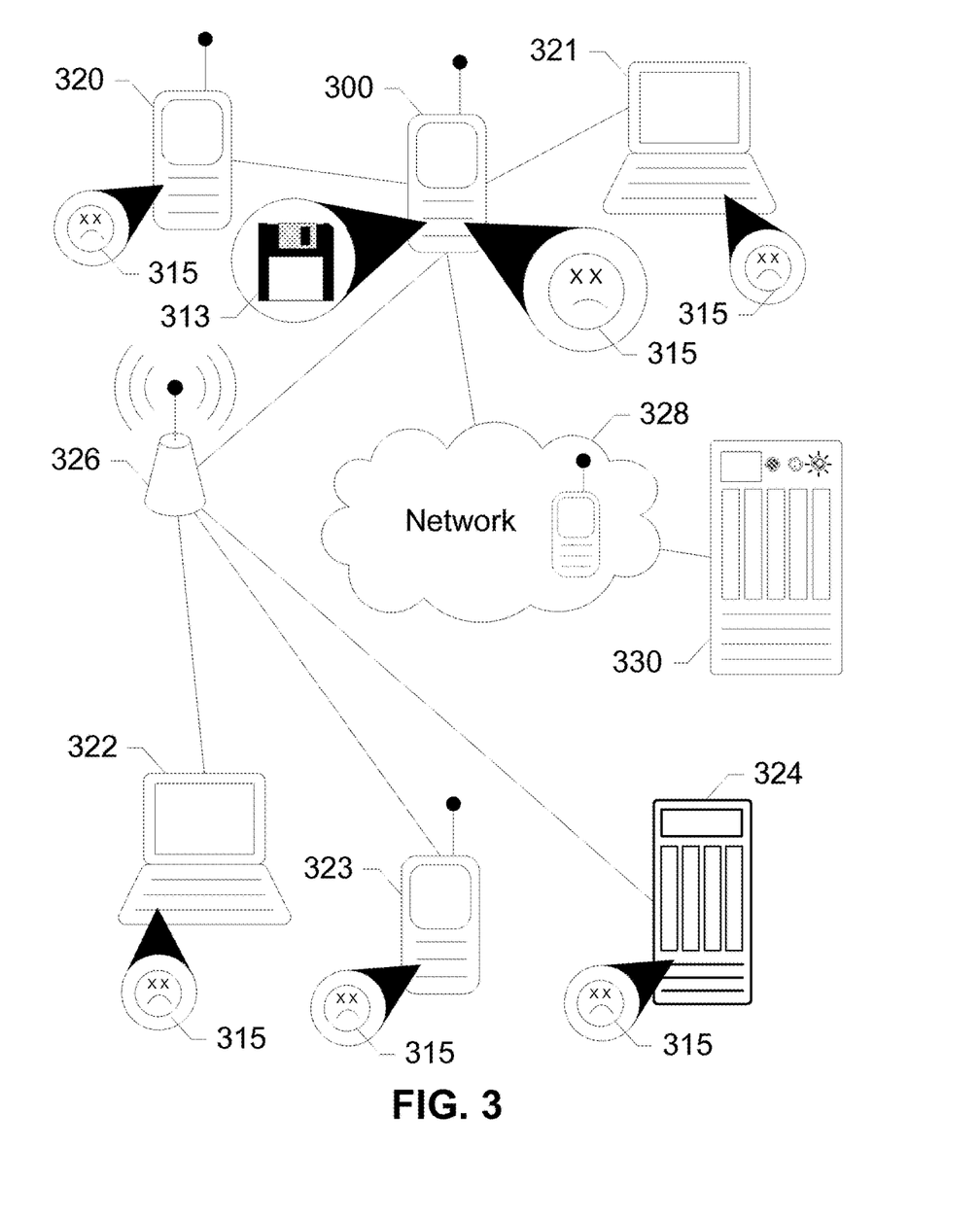
FIG. 3 shows a system for tracking proximity-based mobile malware propagation, according to an exemplary embodiment of the present subject disclosure.

FIG. 3 shows a system for tracking proximity-based mobile malware propagation, according to an exemplary embodiment of the present subject disclosure. The system includes a source mobile communication device 300 including an agent logic 313 and a malware 315; a plurality of victim mobile communication devices 320-324, each including a malware 315; a wireless access point 326; a network 328; and an agent server 330. In this system, the source mobile communication device 300 communicates with the victim mobile communication devices 320 and 321 through a wireless P2P communication in order to spread the malware 315. Before communicating with the victim mobile communication devices 320, 321, the malware 315 must use the source mobile communication device 300 to discover the victim mobile communication devices 320, 321. Upon command from the malware 315, the source mobile communication device 300 broadcasts a discover signal. The agent logic 313, however, intercepts this discovery request. When the victim mobile communication devices 320, 321 respond to the source mobile communication device 300, the agent logic 313 compiles a list including the victim mobile communication devices 320, 321, and at least one trigger.

The triggers appear to a user of the mobile communication device 300 to be unknown and/or unattractive options in the list. The triggers appear to malware 315, however, to be substantially similar to every other option in the list. When a trigger is selected for communication, such as by the malware 315, the agent logic 313 reports malware activity to the agent server 330 through the network 328. When the malware 315 instructs the source mobile communication device 300 to send each of the victim mobile communication devices 320, 321 the malware 315, the source mobile communication device 300 necessarily sends the malware 315 to the agent server 330. The agent server 330 is not affected by the malware 315 and does not send the malware 315 to other mobile communication devices as do victim mobile communication devices 320-324. The agent server 330 records the reception of the malware 315 as well as malware from any other mobile communication device having an agent logic 313 and a malware 315.

The source mobile communication device 300 is also in communication with the wireless access point 326. The victim mobile communication devices 322-324 are connected to the wireless access point 326. The source mobile communication device 300 must first discover the victim mobile communication devices 322-324 through the wireless access point 326 by sending a discovery request as with P2P communication. The agent logic 313 intercepts this discovery request and inserts at least one trigger in a discovered device list. When the source mobile communication device 300 sends the malware 315 to each device in the discovered device list, the source mobile communication device 300 sends the malware 315 to the agent server 330 through the network 328.

FIG. 3 shows the overall architecture of the system and how the system works. The key innovation is the use of the trigger, which is a fake network or device created by the agent logic 313. Not all malware distribute themselves to each and every device, but may distribute to a random selection of devices. In this case, malware is not sent to the agent server 330 every time, but there still is a possibility that the malware will be sent to the agent server 330. If the agent server 330 assumes this fact, then the agent server 330 can estimate the total number of victim mobile communication devices on the network based on the number of triggers that are activated.

Figure 4:
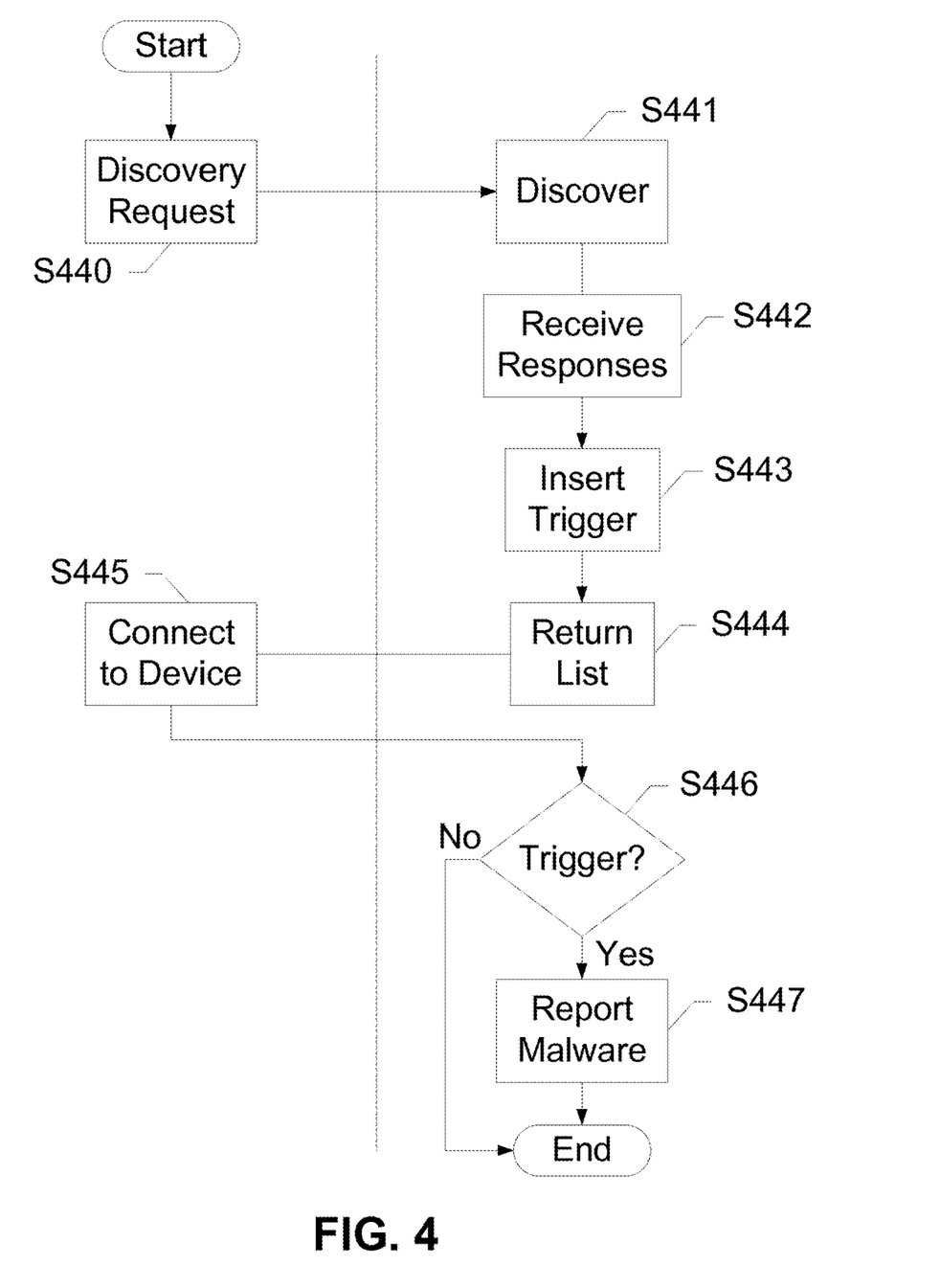
FIG. 4 shows a flow chart for detecting and reporting mobile malware, according to an exemplary embodiment of the present subject disclosure.

FIG. 4 shows a flow chart for detecting and reporting mobile malware, according to an exemplary embodiment of the present subject disclosure. The steps in this flow chart are split by a dotted line. The steps on the left are performed by a malware while the steps on the right are performed by an agent logic. Both the malware and the agent logic are stored and run from a mobile communication device.

First, the malware submits a discovery request S440 to the operating system of a mobile communication device. The agent logic intercepts the discovery request and performs the discovery S441 to search for nearby mobile communication devices. A plurality of mobile communication devices respond to the search, the responses are received by the agent logic S442, and the agent logic compiles a list of nearby mobile communication devices. As part of this compilation, the agent logic inserts one or more triggers S443 into the list of nearby mobile communication devices. Once the triggers have been inserted, the list is returned to the malware S444. When the malware receives the list of nearby mobile communication devices, the malware selects a mobile communication device with which to connect S445. The agent logic receives this selection and determines whether the selection is a mobile communication device or a trigger S446. If the selection is a mobile communication device, then the selection is passed on to the operating system and a connection is made. If the selection is a trigger, then the agent reports the malware activity to the agent server S447.

In other embodiments, the steps performed on the right side of FIG. 4 may be split between the agent logic and an operating system of the mobile communication device. In further embodiments, the agent logic is an integral part of the operating system. However, whether the step is performed by the agent logic or the operating system is not important to the functionality of the method in FIG. 4.

Scan-connecting is a very general way to search for susceptible devices and adopted by many malware. By the steps explained above, the agent detects the malware inevitably by detecting connection requests to the trigger. Moreover, since most users do not connect to unknown devices, the chance of a user selecting to connect to the trigger(s) is much lower than the malware. This makes the malware easily detected. When the malware on the victim device attempts to scan and make new connections, an exemplary embodiment of the proposed detection scheme works as follows: The user application or the malware requests to scan the proximity for "discoverable" Bluetooth/WiFi devices. Next, the operating system performs network/device discovery. Available networks/devices will respond to the discovery request, and a candidate list will be generated accordingly. The agent logic inserts trigger network(s)/device(s) into the candidate list. The responding networks/devices plus the trigger will be reported to the application or malware.

When compared to scan-connect cases, re-connect cases are more "friendly" to attackers, and the reasons are twofold. First, once the other device is within the proximity, the connection is surely established since the configurations, including the security settings (e.g. password/pin), are cached on the device. Second, the operating system will attempt to re-establish the previous successful connections before attempting to scan for new networks and devices. In order to detect reconnection-based malware propagation, a similar technique is used. In this scheme, the agent logic inserts a trigger connection into the cached list of pre-established networks. When a normal user application attempts to re-establish a connection, the user typically knows the last successful used or paired network and device. The user is generally more likely to choose those trusted connections and ignore the trigger. By contrast, the malware does not have such knowledge and inevitably selects the trigger connection upon selecting to connect to all the devices in the cached list.

In summary, for both cases, the agent logic injects trigger(s) into either the returned network/device list for new discovered connections, or in the cached list for pre-established connections. When users choose the desired network/device to establish connections, they are more likely to connect to acknowledged or trusted networks/devices. Meanwhile, the malware blindly chooses a portion or a full list of candidate networks/devices to establish connections. Therefore, under these assumptions, the PMMP-based detection system raises alarms with a relatively low false detection ratio. The false alarms come from legitimate users blindly choosing networks and devices to make connections, which show the same behavior patterns as the victim devices controlled by the malware.

The method is based on the assumption that the user device will not automatically attempt to re-establish connections with the cached networks/devices if these networks/devices are not in proximity. In other words, user devices will first discover whether the cached networks/devices are in proximity if they support automatic network connections without human interaction. Devices violating this assumption will make the normal device behave like a malware since it may also attempt to connect to the trigger. Such devices make detection difficult.

Figure 5:
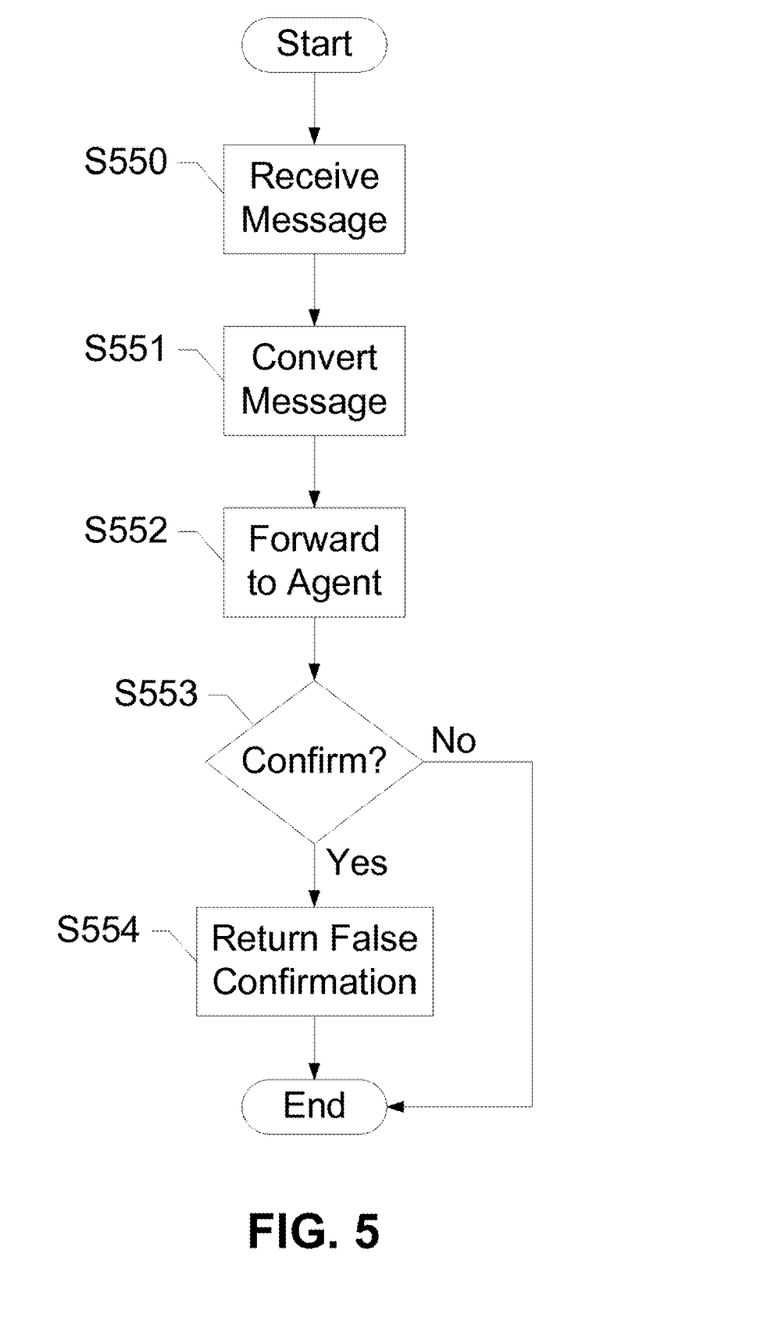
FIG. 5 shows a flow chart for reporting mobile malware, according to an exemplary embodiment of the present subject disclosure.

FIG. 5 shows a flow chart for reporting mobile malware, according to an exemplary embodiment of the present subject disclosure. Malware is reported by an agent logic on a mobile communication device. Prior to the process, the malware attempts to send a message to a device it has discovered. First, the agent logic receives the message S550, which is addressed to a trigger. Next, the message is converted S551 into a format readable by an agent server on a network. Once converted, the message is forwarded to the agent server S552 on the network. Depending on the communication protocol, the malware may expect to see a confirmation of a sent message. The agent logic first determines if the communication protocol warrants a confirmation S553 to be sent to the malware. If a confirmation is warranted, then the agent logic submits a confirmation to the malware, which falsely confirms S554 that the message was sent to the device intended by the malware, even though the message was actually forwarded to the agent server.

Figure 6:
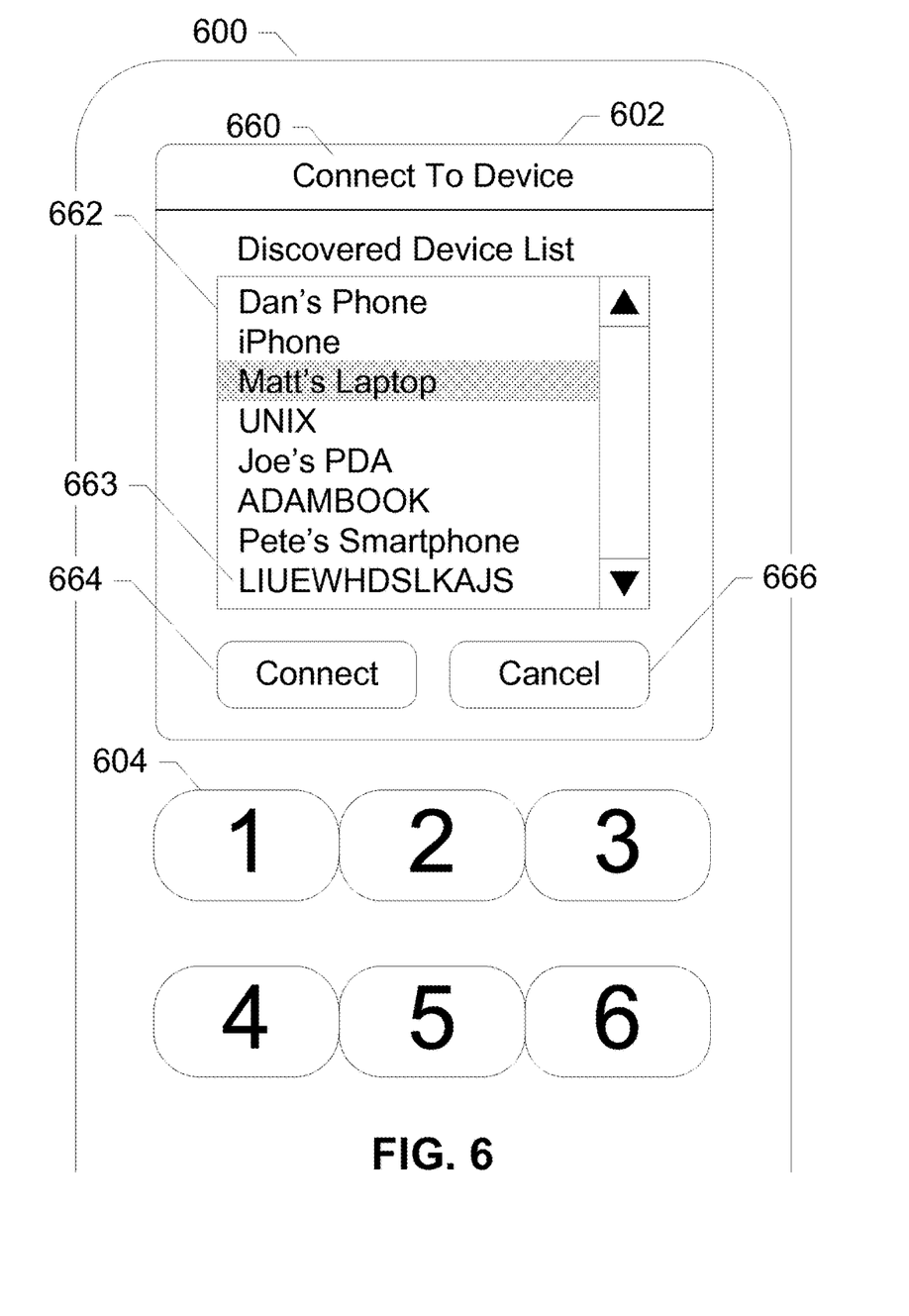
FIG. 6 shows a program for connecting to a device, according to an exemplary embodiment of the present subject disclosure.

FIG. 6 shows a program for connecting to a device ("connection program") 660, according to an exemplary embodiment of the present subject disclosure. Connection program 660 is shown on a mobile communication device 600 having an agent logic. When a user wants to connect to a device, a screen, as shown in this figure, is displayed for the user using the display 602. The connection program 660 includes a discovered device list 662 including a trigger 663, a connect button 664, and a cancel button 666. When the user browses through the discovered device list 662, the trigger 663 appears as an unfamiliar and/or undesirable option. Another option, "Matt's Laptop," has been highlighted for connection because it is familiar to the user. To connect to "Matt's Laptop," the user highlights the device, as shown, and activates the connect button 664. If the user does not wish to connect to any of the devices in the discovered device list 662, then the user activates the cancel button 666. In this embodiment, activation of buttons is performed by using the keypad 604.

If the scan is a legitimate user application request, the user will most likely ignore the trigger and only choose networks/devices that look benign or well-known to the user, and establish the new connection. But, if the scan is from a malware, then due to the lack of user interaction, the malware is unable to distinguish a trigger from the responded networks/devices. Thus, there is a chance that the malware will select the trigger 663 instead of the legitimate networks/devices. As this PMMP-based scanning increases, the probability of the malware choosing at least one trigger will approach one hundred percent (100%) (given an event P, if the probability of P occurring is not strictly zero ("0"), it is best to assume that P will occur, since it will almost surely happen provided that enough time is granted). The agent logic sends the malware reports to the agent server, which reports the malware signatures and victim identities to the service provider for the network.

Other embodiments of the mobile communication device feature a touch screen that performs as a display and an input. The connect button and cancel button can be activated by touching an area of the touch screen in these embodiments.

Figure 7:
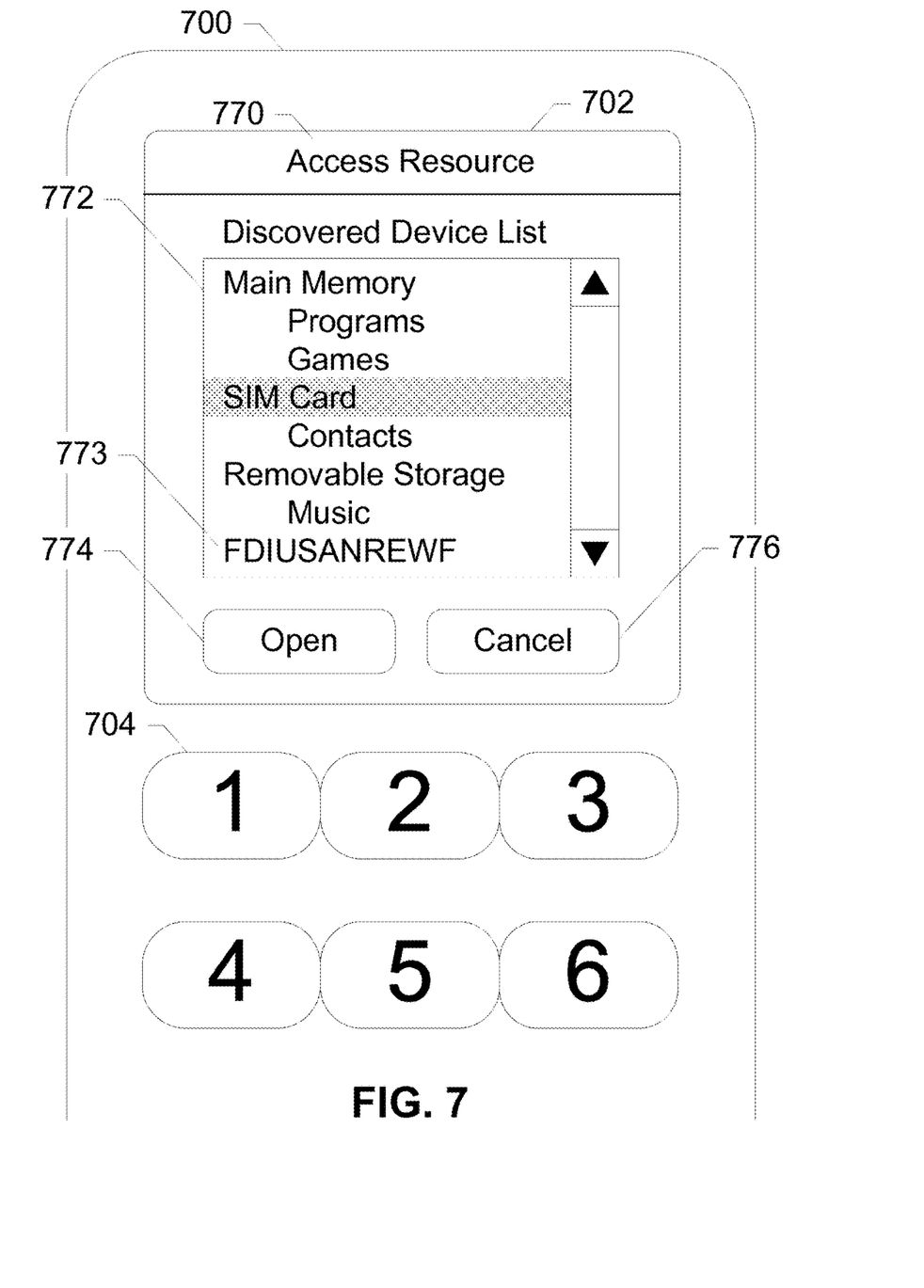
FIG. 7 shows a connection program for accessing a resource, according to an exemplary embodiment of the present subject disclosure.

FIG. 7 shows a connection program 770 for accessing a resource, according to an exemplary embodiment of the present subject disclosure. The connection program 770 is shown on a mobile communication device 700 having an agent logic. When a user wants to access a resource, a screen, as shown in this figure, is displayed for the user using the display 702. The connection program 770 includes a discovered device list 772 including a trigger 773, an open button 774, and a cancel button 776. When the user browses through the discovered device list 772, the trigger 773 appears as an unfamiliar and/or undesirable option. Another option, "SIM Card," has been highlighted for access because it is familiar to the user. To access the "SIM Card," the user highlights the resource, as shown, and activates the open button 774. If the user does not wish to access any of the devices in the discovered device list 772, then the user activates the cancel button 776. In this embodiment, activation of buttons is performed by using the keypad 704.

Other embodiments of the mobile communication device feature a touch screen that performs as a display and an input. The connect button and cancel button can be activated by touching an area of the touch screen in these embodiments.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

The invention claimed is:

1. A device comprising:
a processor; and
logic that, when executed by the processor, causes the processor to perform operations comprising
receiving, from a mobile communications device that executes an agent logic, a malware signature associated with a malware that uses proximity-based malware propagation, wherein execution of the agent logic causes the mobile communications device to generate a list of discovered devices in a proximity of a transceiver of the mobile communications device, to insert a trigger network connection into the list of discovered devices, and to send the malware signature in response to detecting a request to connect to the trigger network connection, and wherein the mobile communications device is one of a plurality of devices that are configured to provide malware signatures.

2. The device of claim 1, wherein the malware signature is received via a communications network.

3. The device of claim 1, wherein the agent logic is configured to insert the trigger network connection into the list of discovered devices in response to detecting a broadcast of a discover signal by the mobile communications device.

4. The device of claim 1, wherein the plurality of devices are agents that provide the malware signatures.

5. The device of claim 4, wherein the mobile communications device and another device of the plurality of devices are associated with different locations.

6. The device of claim 1, wherein the logic, when executed by the processor, causes the processor to perform operations further comprising:
obtaining, from a further mobile communications device, a further malware signature, wherein the malware signature and the further malware signature are collected to detect new malware signatures for malware that uses proximity-based propagation.

7. A system comprising:
a server comprising a processor and logic that, when executed by the processor, causes the server to perform operations comprising
receiving, from a mobile communications device that executes an agent logic, a malware signature associated with a malware that uses proximity-based malware propagation, wherein execution of the agent logic causes the mobile communications device to generate a list of discovered devices in a proximity of a transceiver of the mobile communications device, to insert a trigger network connection into the list of discovered devices, and to send the malware signature in response to detecting a request to connect to the trigger network connection, and wherein the mobile communications device is one of a plurality of devices that are configured to provide malware signatures to the server.

8. The system of claim 7, further comprising a communications network, wherein the malware signature is received via the communications network.

9. The system of claim 7, wherein the agent logic is configured to detect a broadcast of a discover signal by the mobile communications device and, in response to detecting the broadcast discover signal, insert the trigger network connection into the list of discovered devices.

10. The system of claim 7, wherein the plurality of devices are agents that provide the malware signatures.

11. The system of claim 10, wherein the mobile communications device and another device of the plurality of devices are associated with different locations.

12. The system of claim 7, wherein the logic, when executed by the processor, causes the server to perform operations further comprising:
obtaining, from a further mobile communications device, a further malware signature, wherein the malware signature and the further malware signature are collected to detect new malware signatures for malware that uses proximity-based propagation.

13. The system of claim 7, wherein the server comprises an agent server, and wherein the agent server is communicated with by the mobile communications device in response to the agent logic detecting the request to connect to the trigger network connection.

14. A method comprising:
receiving, at a server that comprises a processor, a malware signature associated with a malware that uses proximity-based malware propagation, wherein the malware signature is received from a mobile communications device that executes an agent logic, wherein execution of the agent logic causes the mobile communications device to generate a list of discovered devices in a proximity of a transceiver of the mobile communications device, to insert a trigger network connection into the list of discovered devices, and to send the malware signature in response to detecting a request to connect to the trigger network connection, wherein the mobile communications device is one of a plurality of devices that are configured to provide malware signatures to the server.

15. The method of claim 14, further comprising:
obtaining, from a further mobile communications device, a further malware signature.

16. The method of claim 15, wherein the malware signature and the further malware signature are collected to detect new malware signatures for malware that uses proximity-based propagation.

17. The method of claim 14, wherein the malware signature is received via a communications network.

18. The method of claim 14, wherein the agent logic is configured to detect a broadcast of a discover signal by the mobile communications device and, in response to detecting the broadcast discover signal, insert the trigger network connection into the list of discovered devices.

19. The method of claim 14, wherein the plurality of devices are recruited as agents to provide the malware signatures.

20. The method of claim 19, wherein the mobile communications device and another device of the plurality of devices are associated with different locations.

* * * * *